United States Patent
Hejda et al.

(10) Patent No.: US 12,257,901 B2
(45) Date of Patent: Mar. 25, 2025

(54) METHOD AND DEVICE FOR OPERATING A WINDSHIELD DISPLAY SYSTEM WITH A COVERED DISPLAY DETECTION, AND WINDSHIELD DISPLAY SYSTEM

(71) Applicant: Bayerische Motoren Werke Aktiengesellschaft, Munich (DE)

(72) Inventors: Tomas Hejda, Neufahrn (DE); Sadzida Kratz, Munich (DE); Christopher Rölle, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/286,425

(22) PCT Filed: Apr. 4, 2022

(86) PCT No.: PCT/EP2022/058904
§ 371 (c)(1),
(2) Date: Oct. 11, 2023

(87) PCT Pub. No.: WO2022/238050
PCT Pub. Date: Nov. 17, 2022

(65) Prior Publication Data
US 2024/0198801 A1 Jun. 20, 2024

(30) Foreign Application Priority Data
May 10, 2021 (DE) ............ 10 2021 112 097.7

(51) Int. Cl.
*B60K 35/28* (2024.01)
*G01S 15/04* (2006.01)
*G06V 20/59* (2022.01)

(52) U.S. Cl.
CPC ............. *B60K 35/28* (2024.01); *G01S 15/04* (2013.01); *G06V 20/59* (2022.01);
(Continued)

(58) Field of Classification Search
CPC ............. B60K 35/234; B60K 35/90; B60K 2360/785; B60K 2360/349; G06V 10/60;
(Continued)

(56) References Cited

U.S. PATENT DOCUMENTS

2005/0140929 A1 6/2005 Nambudiri et al.
2011/0163996 A1* 7/2011 Wassvik ............ G06F 3/0421
178/18.09
(Continued)

FOREIGN PATENT DOCUMENTS

DE 10 2012 021 972 A1 5/2014
DE 10 2015 202 457 A1 8/2016
(Continued)

OTHER PUBLICATIONS

International Search Report (PCT/ISA/210) issued in PCT Application No. PCT/EP2022/058904 dated Jul. 13, 2022 with English translation (6 pages).
(Continued)

*Primary Examiner* — Stephen G Sherman
(74) *Attorney, Agent, or Firm* — Crowell & Moring LLP

(57) ABSTRACT

A reflection display system for displaying a display image for a vehicle occupant of a motor vehicle by reflecting the display image on a windshield is provided. The system includes a display unit which is designed to display the display image via a display surface of the display unit, wherein the display unit is arranged on an upper face of a dashboard, in a recess, such that a reflection of the display image via the windshield can be perceived in the eye region of a vehicle occupant, a detection sensor system which is designed to detect a foreign object present on the display surface, and a control unit which is designed to signal a disruption of the display of the display image if the foreign object is detected on the display surface.

14 Claims, 3 Drawing Sheets

(52) U.S. Cl.
CPC .... *B60K 2360/143* (2024.01); *B60K 2360/23* (2024.01); *B60K 2360/332* (2024.01); *B60K 2360/785* (2024.01)

(58) Field of Classification Search
CPC ............ G06V 2201/07; G02B 27/0101; G02B 2027/0118; G06F 3/0421
See application file for complete search history.

(56) References Cited

U.S. PATENT DOCUMENTS

| | | | |
|---|---|---|---|
| 2012/0205175 A1* | 8/2012 | Masserang | B62D 65/18 180/218 |
| 2014/0333647 A1 | 11/2014 | Lee | |
| 2015/0309206 A1 | 10/2015 | Kuntze et al. | |
| 2017/0168295 A1 | 6/2017 | Iwami | |
| 2018/0104721 A1* | 4/2018 | Dannan | G02B 27/0006 |
| 2018/0131880 A1* | 5/2018 | Hicks | H04N 5/58 |
| 2019/0204592 A1 | 7/2019 | Fujita | |
| 2019/0212550 A1 | 7/2019 | Fujita | |
| 2019/0271905 A1 | 9/2019 | Fujita | |
| 2021/0213883 A1* | 7/2021 | Lu | B60R 1/0602 |
| 2022/0146818 A1 | 5/2022 | Inoue et al. | |

FOREIGN PATENT DOCUMENTS

| | | |
|---|---|---|
| EP | 2 233 962 A2 | 9/2010 |
| EP | 2 693 253 A1 | 2/2014 |
| EP | 2 693 256 A1 | 2/2014 |
| JP | 2009157253 A * | 7/2009 ......... G02B 27/0006 |
| JP | 2010-243940 A | 10/2010 |
| JP | 2016-197768 A | 11/2016 |
| JP | 2018-4951 A | 1/2018 |
| KR | 10-2014-0131760 A | 11/2014 |
| KR | 10-2017-0069178 A | 6/2017 |
| WO | WO 2018/134012 A1 | 7/2018 |
| WO | WO 2020/189646 A1 | 9/2020 |
| WO | WO 2020/250739 A1 | 12/2020 |

OTHER PUBLICATIONS

German-language Written Opinion (PCT/ISA/237) issued in PCT Application No. PCT/EP2022/058904 dated Jul. 13, 2022 with English translation (12 pages).

German Search Report issued in German Application No. 10 2021 112 097.7 dated Jan. 28, 2022 with partial English translation (11 pages).

International Search Report (PCT/ISA/210) issued in PCT Application No. PCT/EP2022/053218 dated May 3, 2022 with English translation (4 pages).

German-language Written Opinion (PCT/ISA/237) issued in PCT Application No. PCT/EP2022/053218 dated May 3, 2022 with English translation (9 pages).

German Search Report issued in Application No. 10 2021 112 096.9 dated Feb. 1, 2022 with partial English translation (11 pages).

U.S. Non-Final Office Action issued in U.S. Appl. No. 18/286,420 dated Aug. 19, 2024 (26 pages).

* cited by examiner

METHOD AND DEVICE FOR OPERATING A WINDSHIELD DISPLAY SYSTEM WITH A COVERED DISPLAY DETECTION, AND WINDSHIELD DISPLAY SYSTEM

CROSS REFERENCE TO RELATED APPLICATION

This application contains subject matter related to U.S. application Ser. No. 18/286,420, entitled "Method and Device for Operating a Windshield Display System with a Covered Display Detection, and Windshield Display System," filed on even date herewith.

BACKGROUND AND SUMMARY OF THE INVENTION

The invention relates to windshield display systems, in particular reflection display systems, such as, for example, PHUD, for motor vehicles. In particular, the present invention relates to measures for detecting an object located in the optical beam course of the windshield display system.

Reflection display systems, such as, for example, PHUD, comprise a display unit arranged on the upper side of the dashboard, the display of which reflects on the inside of the windshield and which can be perceived by a vehicle occupant. The display unit is arranged somewhat depressed on the upper side of the dashboard here so that a direct view of the display surface of the display unit is prevented, in order to thus avoid blinding of the user by light directly incident into the eye.

However, due to the arrangement of the display unit in such a depression on the upper side of the dashboard, foreign objects which rest on the display unit are not readily visible from the normal eye position of the vehicle occupants either. However, these foreign objects lie in the beam path of the display image and can thus conceal parts of the display, so that possibly legally relevant display symbols, such as, for example, speedometer, chamber lights, remaining range, and the like are not visible, but the absence of these display symbols is also not noticed since they are not permanently displayed.

A use of a cover pane, as is used in classic head-up displays, for example, is disadvantageous in such reflection display devices, since new reflections of ambient light on the windshield can thus arise, which significantly impair the perceptibility of the reflection image in the event of high ambient brightness.

It is the object of the present invention to provide an improved method for detecting concealments of a display image in a reflection display system.

This object is achieved by a method for operating a windshield display system and by a detection device and a display system according to the independent claims.

Further embodiments are specified in the dependent claims.

According to a first aspect, a reflection display system is provided for displaying a display image for a vehicle occupant of a motor vehicle by reflection of a display image on a windshield, comprising:

a display unit, which is designed to output the display image via a display surface of the display unit, wherein the display unit is in particular arranged in a depression on an upper side of a dashboard so that a reflection of the display image is perceptible via the windshield in an eye region of a vehicle occupant, a detection sensor system which is designed to detect a foreign object present on the display surface;

a control unit which is designed to signal a disturbance of the display of the display image upon detection of the foreign object on the display surface.

Foreign objects which are deposited on the dashboard can entirely or partially conceal components for displaying information via the windshield. If the reflection display system is used to display safety-relevant information, however, it is necessary to be able to distinguish a non-display of information from blocking of the display of the information due to a resting foreign object.

Foreign objects in the meaning of this invention can be arbitrary objects which obstruct the perception of a display image, such as, e.g., pieces of clothing, papers, and the like.

In particular if the display unit is arranged in a depression on the upper side of the dashboard, however, foreign objects which rest on the display unit are not readily visible from the normal eye position of the vehicle occupants. However, these foreign objects lie in the beam path of the display image and can thus conceal parts of the display, so that possibly safety-relevant and legally prescribed display systems, such as, for example, speedometer, chamber lights, remaining range, and the like are not visible. However, the absence of these display symbols cannot be readily noticed, since they are not permanently displayed.

With the aid of the above reflection display system, it is possible to recognize whether it is free of resting foreign objects on the display surface of the display unit. It can thus be detected whether the beam path of the reflection display system is disturbed by a foreign object on the display surface. A detection of such an interruption of the display of the reflection display system is essential to be able to signal a warning or other countermeasures. The above reflection display system thus enables automated detection of a foreign object disturbing the display image on the display surface of the display unit.

Furthermore, the display unit can be arranged in the depression so that the display image which is displayed on the display surface of the display unit is not perceptible directly in the eye region.

The detection sensor can be designed in various ways.

It can be provided that the detection sensor system includes a light barrier sensor system, in particular having at least one light source for outputting nonvisible light and having at least one photodetector, which is designed to detect the presence of one of the foreign objects by establishing an interruption of one or more light beams guided along the surface of the display surface of the display unit.

The detection sensor can comprise a light barrier, for example, which effectuates one or more light beams over the display surface, so that in the event of interruption of one of the light beams in a photodetector (photodiode), a signal change can be detected which can result in the signaling of a disturbance.

In particular, it can be provided that the light beams guided along the surface are aligned so that they are reflected at one or more reflection points on the display surface.

According to a further embodiment, the detection sensor system can include a reflection light measurement sensor system, which, to detect the foreign object on the display surface, directs light onto the display surface and receives a strength of the light reflected on the display surface and possibly on the foreign object, wherein the control unit is designed to detect the foreign object in the event of a change of the strength of the reflected light.

A reflection measurement can therefore be performed on the display surface of the reflection display unit with the aid of nonvisible light. It is detected when a reflection change is established in relation to a reflectance with an uncovered display surface, so that the reflection change indicates the presence of a foreign object.

According to a further embodiment, the detection sensor system can include a cover pane sensor system, in which light is coupled into the cover pane and the coupled-in light is received after its decoupling, wherein the control unit is designed to detect the foreign object in the event of a change of the strength of the decoupled light.

For example, infrared light can be coupled into the transparent cover pane (made of plastic or glass or another transparent material) of the display surface, wherein a resting foreign object changes the reflection characteristics of the light beam guided in the cover pane and a detection of a resting foreign object can thus be detected. Moreover, a condensation or icing detection can also be carried out with the aid of such a cover pane sensor system.

According to a further embodiment, the detection sensor system can include a touch sensor system, which provides a measurement signal corresponding to a capacitance change due to the presence of a foreign object on the display surface, wherein the control unit is designed to detect the foreign object in the event of a change of the measurement signal.

In this regard, the detection sensor can include a capacitive sensor system, so that objects having a capacitive mass can be detected due to capacitance change.

According to a further embodiment, the detection sensor system can comprise an image acquisition sensor system, which in particular includes one or more cameras and/or one or more depth sensors, wherein the presence of a foreign object on the display surface is established with the aid of an object detection method.

With the aid of a depth camera, in particular based on LiDAR or radar technology, objects which are located in the depression of the dashboard can have a three-dimensional topology deviating from the uncovered state. Such a 3D topology can be detected with the aid of the depth camera.

According to a further embodiment, the detection sensor system can comprise an ultrasonic sensor system, wherein an ultrasonic signal is directed onto the display surface and a strength of a reception signal is detected, wherein the control unit is designed to detect the foreign object in the event of a change of the strength of the reception signal.

With the aid of the ultrasonic detection, a detection of a change of a reflection characteristic of emitted and received ultrasonic signals can be detectable.

According to a further aspect, a motor vehicle is provided, comprising:
  a dashboard between a windshield of the motor vehicle and a steering column;
  the above reflection display system.

According to a further aspect, a method for detecting a foreign object on a display unit of a reflection display system is provided, which causes a reflection of a display image on a windshield into an eye region of a vehicle occupant, wherein the presence of a foreign object on a display surface of the display unit is detected with the aid of a detection sensor system and wherein the presence of a foreign object is signaled upon establishing the presence of the foreign object on the display surface.

Embodiments are explained in more detail hereinafter on the basis of the appended drawings. In the figures:

DETAILED DESCRIPTION OF THE DRAWINGS

Figure 1:
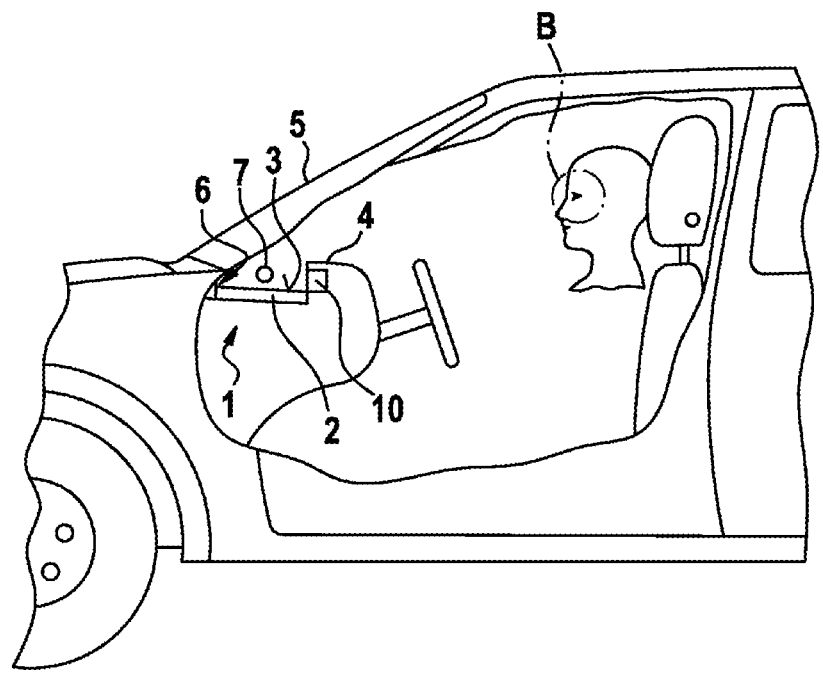
FIG. 1 shows a schematic cross-sectional view of a reflection display system in a motor vehicle having a light barrier as a detection sensor system.

FIG. 1 shows a schematic cross-sectional view through a motor vehicle having a reflection display system 1. The reflection display system is arranged on an upper side of a dashboard 4 and includes a display unit 2, which comprises a display surface 3 for displaying a display image. The display unit 2 is arranged on the upper side of the dashboard 4 below a windshield 5.

The display surface 3 is aligned with respect to the windshield 5 so that a display image displayed on the display surface of the display unit 2 is reflected at a lower region of the inside of the windshield 5 and can be perceived by a vehicle occupant in an eye region B. The alignment of the display unit 2 or its display surface can thus be preferably essentially parallel to the vehicle longitudinal and transverse axis or can deviate therefrom by an angle of not more than 0-20°.

The display unit 2 can be attached in a depression 6 of the dashboard, so that it is not possible for the vehicle occupant to view the display surface 3 of the display unit 2 directly and blinding of the vehicle occupants by direct light from the display surface 3 in the eye region B is avoided. Furthermore, the display surface 3 of the display unit 2 is aligned so that a displayed display image is reflected on the inside of the windshield 5 and can be perceived by a vehicle occupant in an eye region B as a reflection image on the windshield 5.

The display unit 2 is preferably designed as a micro-LED display unit, in order to provide a bright display image, so that the generated reflection can be perceived even with a high level of ambient brightness above the corresponding region of the windshield 5.

Since the display unit 2 is arranged in the depression 6 on the upper side of the dashboard 4, a foreign object 7 can also enter this depression 6 and thus come to rest on the display surface 3 of the display unit 2. A display image displayed on the display unit 2 then cannot be perceived or can only be perceived partially as a reflection image by a vehicle occupant.

To detect whether the foreign object 7 rests on the display surface 3 or not, a detection sensor system 10 can be provided, which is first indicated in principle in FIG. 1. The detection sensor system 10 can use various measurement principles and possibly combine them in order to detect a foreign object 7 resting on the display surface 3.

The detection sensor system 10 has a communication connection to a control unit 9, which, upon a detection of the foreign object 7 with the aid of the detection sensor system 10, signals the blocking of the display by the foreign object 7 in a suitable manner to the vehicle occupant, in particular the driver of the motor vehicle, for example, by an acoustic and/or visual warning signal.

Figure 2A:
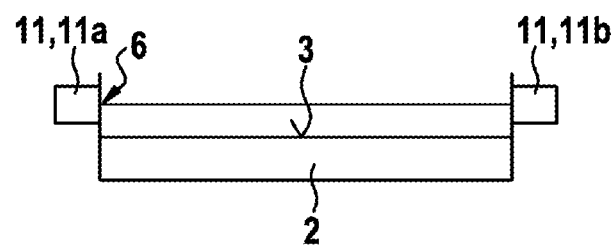
FIGS. 2a and 2b show more detailed cross-sectional views of the reflection display system having a light barrier sensor system as the detection sensor system for detecting foreign objects on the display surface.

FIG. 2a shows a cross-sectional view of the reflection display system 1 having a light barrier sensor system 11 as an example of a detection sensor 10. The light barrier sensor system 11 includes one or a plurality of light beams extending over the display surface 3, which are output by one or more light sources 11a and are directed onto one or more photodetectors 11b. If one of the light beams is interrupted by a resting foreign object 7, this can be detected on the basis of a signal via the photodetector 11b or the photodetectors 11b.

The light beams are preferably surface-parallel to the display surface 3 and are arranged at a small distance of, for example, between 0.1 to 1 cm above the display surface 3.

Figure 2B:
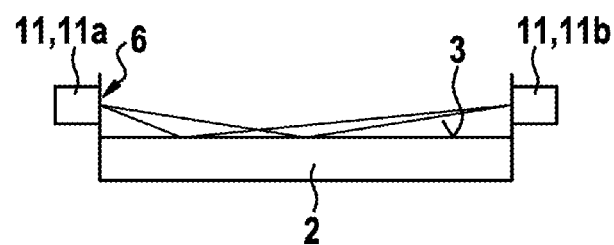

In an alternative embodiment, which is shown in the cross-sectional view of the reflection display system 1 of FIG. 2b, one or more of the light beams of the light beams extending between the one or more light sources 11a and the one or more photodetectors 11b can also be reflected on the surface of the display surface 3. This can preferably take place via reflection points R arranged distributed in a planar manner on the display surface 3, at which total reflection is present. In this way, resting foreign objects 7 having a thickness less than the distance between the light beams and the surface of the display surface 3, as in FIG. 2a, can also be detected.

Figure 3:
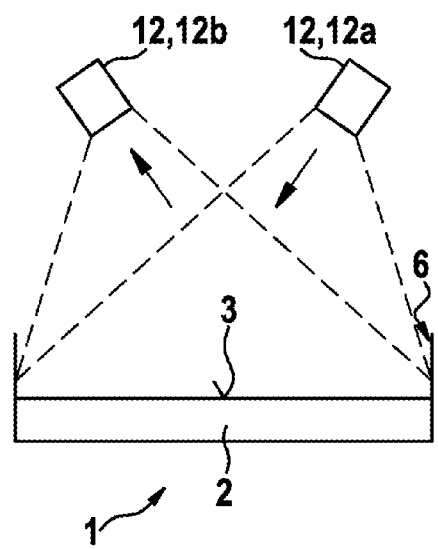
FIG. 3 shows a cross-sectional view of the display unit having a reflection light measurement sensor system for measuring a strength of light directed onto the display surface.

An alternative detection sensor system 10 is shown in FIG. 3, which is formed with the aid of a reflection light measurement sensor system 12. The reflection light measurement sensor system 12 includes a light source 12a, which is directed toward the display surface 3 and preferably directs light distributed over the entire display surface 3. The light source 12a can preferably include an infrared light source. The light source 12a can be arranged in the direction of a transverse extension of the motor vehicle laterally to the reflection display system 1, so that the beam path between display unit 2, the windshield 5, and the eye region B of the vehicle occupant is not interrupted.

With the aid of a photodetector 12b, the strength of the light reflected from the display surface 3 is detected and its strength is measured. The photodetector 12b can be arranged in the direction of a transverse extension of the motor vehicle laterally to the reflection display system 1, so that the beam path is not interrupted between display unit 2, the windshield 5, and the eye region B of the vehicle occupant. If the measure of the strength of the reflected light changes, a resting foreign object 7 can thus be concluded in the control unit 9.

Figure 4:
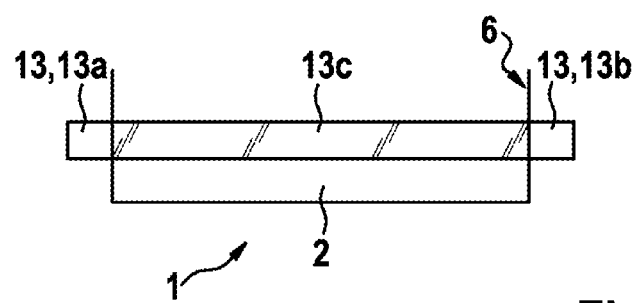
FIG. 4 shows a cross-sectional view of the display unit having a reflection light measurement sensor system for measuring a strength of a light decoupling of light coupled into the cover pane of the display unit.

An alternative detection sensor system 10 in the form of a cover pane sensor system 13 is shown in FIG. 4, in which light, in particular nonvisible light, such as, e.g., infrared light, can be coupled laterally by a light source 13a into a transparent cover pane 13c of the display surface 3. The coupled-in light can be guided by total reflections within the cover pane 13c and can be decoupled by a photodetector 13b at another point of the edge of the cover pane 13c and received. A resting foreign object 7 changes the reflection properties at the outer surface of the cover pane 13c in the region of the resting foreign object 7, so that a photodetector 13b, which is opposite, for example, to the light source 13a with respect to the cover pane 13c, receives or can detect a change of the strength of the received light guided through the cover pane. This signal change in the control unit 9 can be interpreted as the presence of a resting foreign object 7.

Figure 5:
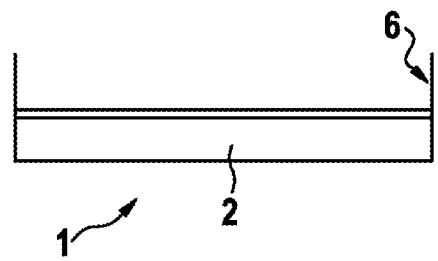
FIG. 5 shows a cross-sectional view of a design of the display surface having a touch sensor system, in order to detect foreign objects having a capacitive mass due to change of a capacitance of the display surface.

FIG. 5 shows an embodiment in which the surface of the display unit 2 can be provided with a touch sensor system 14. The touch sensor system 14 corresponds to a capacitive sensor system. Foreign objects 7 which have a capacitive mass can thus be detected by a capacitance change in a manner known per se by the control unit 9.

Figure 6:
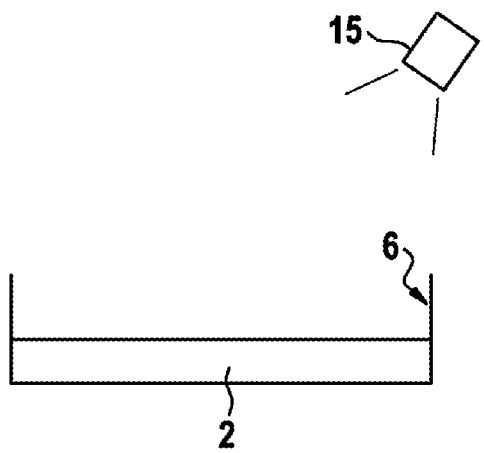
FIG. 6 shows a cross-sectional view of the reflection display system having an image acquisition sensor system as the detection sensor for a foreign object on the display surface of the display unit.

As is shown in the embodiment of FIG. 6, furthermore an image acquisition sensor system 15, for example, having one or more cameras, can be directed onto the display surface 3 of the display unit 2, so that a resting foreign object 7 on the display surface 3 can immediately be detected by a suitable image recognition method executed in the control unit 9.

Alternatively, the image acquisition sensor system 15 can also comprise a depth camera (lidar, radar), which is capable of detecting the three-dimensional topology of a foreign object 7 in the depression 6 on the upper side of the dashboard 4. If a foreign object 7 is located on the display surface 3 of the display unit 2 within the depression 6, the three-dimensional topology thus changes, which can be detected by the corresponding depth camera. Alternatively, instead of the image acquisition sensor system 15, an ultrasonic sensor can also be provided, the reflection signal of which can change accordingly upon the presence of a foreign object 7 on the display surface 3.

Figure 7:
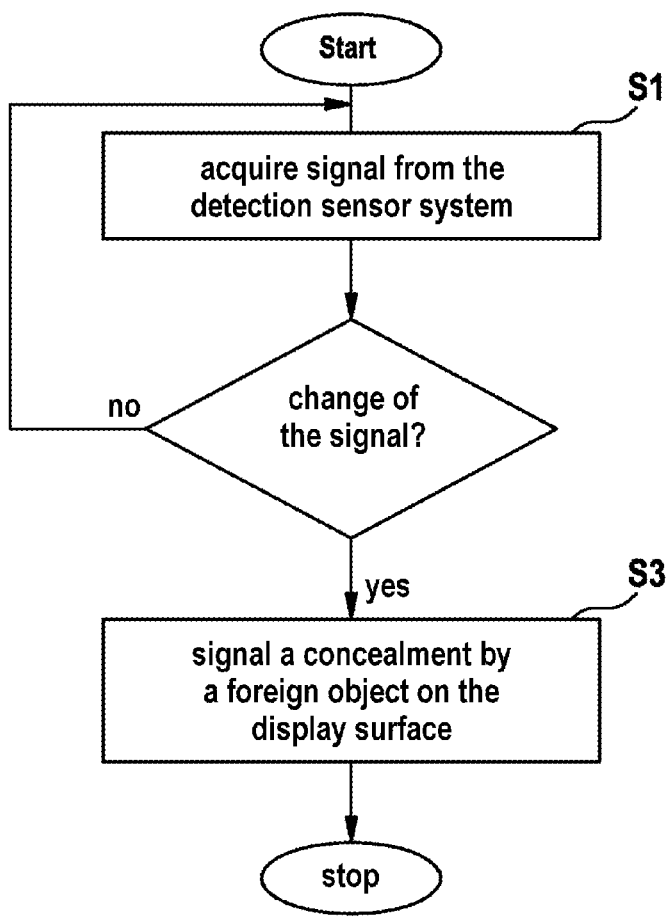
FIG. 7 shows a flow chart to illustrate a method for signaling a presence of a foreign object on the display surface of the display unit.

FIG. 7 shows a flow chart to illustrate a method for detecting a foreign object 7, which can be executed in the control unit.

In step S1, a signal of the detection sensor system 10 is acquired.

In step S2, it is checked whether a signal change of the detection sensor system is present. If a signal change is present (alternative: yes), the method is continued with step S3, otherwise (alternative: no), the sequence returns to step S1.

If it is detected in step S2 that a foreign object 7 is present on the display surface, the presence of a foreign object 7 on the display surface 3 is thus signaled. The signaling can take place with the aid of an optical or acoustic signal or in another manner which makes the vehicle occupants aware that the display is at least partially concealed.

LIST OF REFERENCE SIGNS 1 reflection display system
2 display unit
3 display surface
4 dashboard
5 windshield
6 depression
7 foreign object
9 control unit
10 detection sensor system
11 light barrier sensor system
11a light source
11b photodetectors 12 reflection light measurement sensor system
12a light source
12b photodetector
13 cover pane sensor system
13a light source
13b photodetector
13c transparent cover pane
14 touch sensor system
15 image acquisition sensor system
B eye region

What is claimed is:

1. A reflection display system for displaying a display image for a vehicle occupant of a motor vehicle by reflection of the display image on a windshield, comprising:
   a display unit configured to output the display image via a display surface of the display unit, wherein the display unit is arranged, in a depression, on an upper side of a dashboard such that a reflection of the display image is perceptible via the windshield in an eye region of a vehicle occupant,
   a detection sensor configured to detect a foreign object that is present on the display surface; and
   a control unit configured to signal a disturbance of the display of the display image upon detection of the foreign object on the display surface;
   wherein the detection sensor includes a light barrier sensor having at least one light source for outputting nonvisible light and having at least one photodetector, wherein the light barrier sensor is configured to detect the presence of the foreign object by establishing an interruption of one or more light beams guided along the surface of the display surface of the display unit; and
   wherein the light beams guided along the surface are aligned such that they are reflected at one or more reflection points on the display surface.

2. The reflection display system according to claim 1, wherein the display unit is arranged in the depression such that the display image is not perceptible directly in the eye region.

3. The reflection display system according to claim 2, wherein the detection sensor includes a reflection light measurement sensor, which, to detect the foreign object on the display surface, directs light onto the display surface and receives a strength of the light reflected on the display surface and on the foreign object, wherein the control unit is designed to detect the foreign object in the event of a change of the strength of the reflected light.

4. The reflection display system according to claim 2, wherein the detection sensor includes a cover pane sensor, in which light is coupled into a cover pane and the coupled-in light is received after its decoupling, wherein the control unit is designed to detect the foreign object in the event of a change of the strength of the decoupled light.

5. The reflection display system according to claim 2, wherein the detection sensor includes a touch sensor, which provides a measurement signal corresponding to a capacitance change due to the presence of the foreign object on the display surface, wherein the control unit is designed to detect the foreign object in an event of a change of the measurement signal.

6. The reflection display system according to claim 2, wherein the detection sensor comprises an image acquisition sensor, which includes one or more cameras and/or one or more depth sensors, wherein the presence of a foreign object on the display surface is established based on an object identification method.

7. The reflection display system according to claim 2, wherein the detection sensor comprises an ultrasonic sensor, wherein an ultrasonic signal is directed onto the display surface and a strength of a reception signal is detected, wherein the control unit is designed to detect the foreign object in an event of a change of the strength of the reception signal.

8. The reflection display system according to claim 1, wherein the detection sensor includes a reflection light measurement sensor, which, to detect the foreign object on the display surface, directs light onto the display surface and receives a strength of the light reflected on the display surface and on the foreign object, wherein the control unit is configured to detect the foreign object in the event of a change of the strength of the reflected light.

9. The reflection display system according to claim 1, wherein the detection sensor includes a cover pane sensor, in which light is coupled into a cover pane and the coupled-in light is received after its decoupling, wherein the control unit is designed to detect the foreign object in the event of a change of the strength of the decoupled light.

10. The reflection display system according to claim 1, wherein the detection sensor includes a touch sensor, which provides a measurement signal corresponding to a capacitance change due to the presence of the foreign object on the display surface, wherein the control unit is designed to detect the foreign object in an event of a change of the measurement signal.

11. The reflection display system according to claim 1, wherein the detection sensor comprises an image acquisition sensor, which includes one or more cameras and/or one or more depth sensors, wherein the presence of a foreign object on the display surface is established based on an object identification method.

12. The reflection display system according to claim 1, wherein the detection sensor comprises an ultrasonic sensor, wherein an ultrasonic signal is directed onto the display surface and a strength of a reception signal is detected, wherein the control unit is designed to detect the foreign object in an event of a change of the strength of the reception signal.

13. A motor vehicle comprising:
   a dashboard between a windshield of the motor vehicle and a steering column; and
   the reflection display system according to claim 1.

14. A method for detecting a foreign object on a display unit of a reflection display system, which causes a reflection of a display image on a windshield in an eye region of a vehicle occupant, wherein the presence of the foreign object on a display surface of the display unit is detected with the aid of a detection sensor and wherein upon establishing the presence of the foreign object on the display surface, the presence of the foreign object is signaled;
   wherein the detection sensor includes a light barrier sensor having at least one light source for outputting nonvisible light and having at least one photodetector, wherein the light barrier sensor is configured to detect the presence of the foreign object by establishing an interruption of one or more light beams guided along the surface of the display surface of the display unit; and
   wherein the light beams guided along the surface are aligned such that they are reflected at one or more reflection points on the display surface.

* * * * *